W. K. SCHAEFER.
OVEN AND ASSOCIATED HEATING APPARATUS.
APPLICATION FILED FEB. 29, 1916.
1,276,969.
Patented Aug. 27, 1918.
2 SHEETS—SHEET 1.
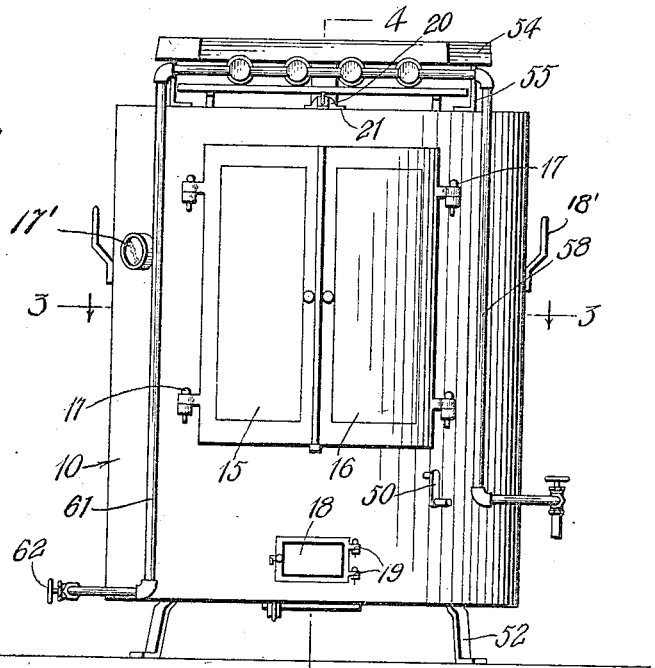
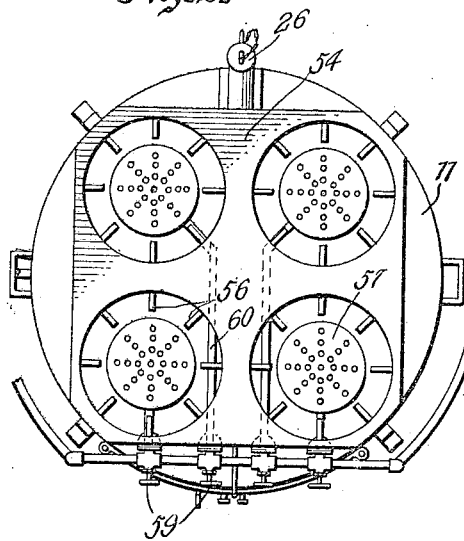
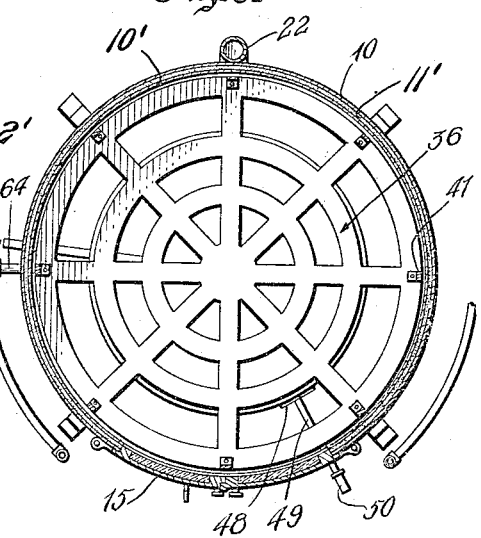
INVENTOR
William K. Schaefer

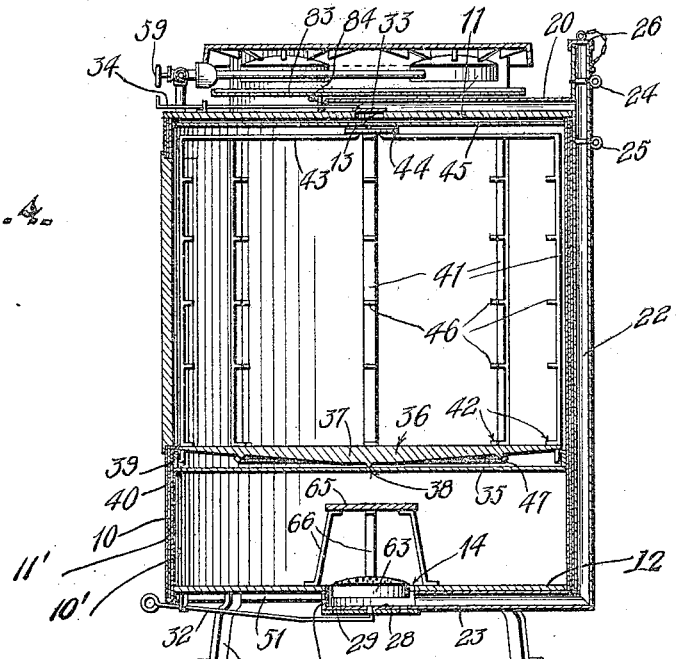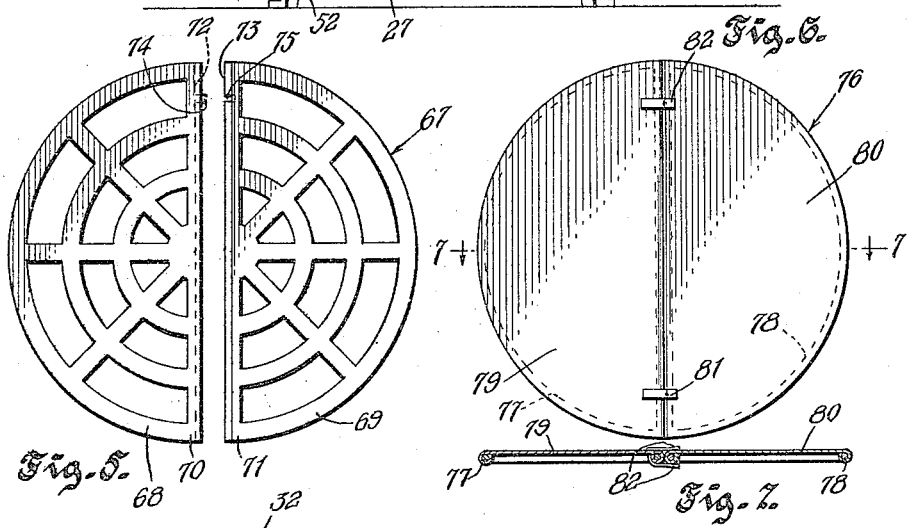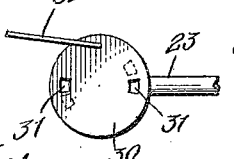

UNITED STATES PATENT OFFICE.

WILLIAM K. SCHAEFER, OF FAIRMONT, WEST VIRGINIA.

OVEN AND ASSOCIATED HEATING APPARATUS.

1,276,969.   Specification of Letters Patent.   Patented Aug. 27, 1918.

Application filed February 29, 1916. Serial No. 81,221.

*To all whom it may concern:*

Be it known that I, WILLIAM K. SCHAEFER, a citizen of the United States, residing at Fairmont, in the county of Marion and State of West Virginia, have invented certain new and useful Improvements in Ovens and Associated Heating Apparatus, of which the following is a specification.

This invention comprehends improvements in ovens and associated heating apparatus and aims, primarily, to provide improvements upon Patent No. 1,148,863, Serial No. 851592, granted to me August 3, 1915.

My invention further contemplates the provision of improved oven construction wherein the heated air given off by the burner may be again introduced thereinto and thus create a continuous flow of air to and from the oven, subject to the desire, and discretion, of the operator.

Another object of my invention is to provide means, as above stated, whereby the heated air may be returned to, and again passed through the oven, thus insuring a uniform temperature, at all times, and further, minimizing the amount of fuel consumed.

As another object, my invention further contemplates the provision of improved means to control the admission of cold air to the burner which, by reason of its peculiar construction, and arrangement with respect to the oven, will cause the cold air and the returning heat products to be mixed prior to the admission of the former to the oven; whereby chilling of the oven due to the admission of cold air is eliminated.

A further object resides in the provision of a novel form of article carrier to be associated with and arranged interiorly of the oven and which, by reason of its novel construction, may be rotated from time to time, or in fact, continuously, so as to insure uniform baking of the substance carried thereon.

A still further object of my invention is to provide a device of the type in question that is extremely simple in construction, strong and durable, and highly practical from both the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in front elevation, illustrating my invention as in its preferred embodiment.

Fig. 2 is a view in top plan.

Fig. 3 is a view in horizontal section, taken on line 3—3 of Fig. 1.

Fig. 4 is a view in vertical section, taken on line 4—4 of Fig. 1.

Fig. 5 is a view in plan of an improved form of supporting disk, that is designed for use in connection with the article carrier.

Fig. 6 is a view in plan of an improved form of heating plate that is also designed for use in connection with the article carrier.

Fig. 7 is a view in cross section, taken on line 7—7 of Fig. 6, and

Fig. 8 is a bottom view in detail of a mixing drum and means to control the admission of cold air thereinto.

In the present embodiment, body member 10 of the oven structure may be of metal or of any other desired material and includes cover plate 11 at its upper end and bottom plate 12 that is arranged adjacent the lower end. Top plate 11 is provided with a central opening 13 to permit the escape of the heat products of the oven, such as will subsequently appear, while bottom plate 12 has a central opening 14, as clearly shown in Fig. 4. Although not wishing to limit myself in any way, it is pointed out that an inner casing 10' may be provided, if so desired, which, when positioned, as in the present embodiment, will permit of the inter-positioning of a packing and insulating material, 11' between the same, and the main casing or body 10. By this arrangement it will be obvious that the heat generated within the oven will be adequately confined therein and, further, that the atmosphere adjacent the oven will not become heated to any material extent. It is further pointed out, that any suitable means (not shown) may be interposed between the casings above referred to in order to insure their rigidity at all times.

Body member 10 is further provided at a suitable point about its cylindrical face with an ingress and egress opening, which is normally closed through the instrumentality of door sections 15 and 16 that are hingedly mounted on the body as at 17. A second opening is formed in body member 10 below door sections 15 and 16 and preferably in proximity to its lower edge for permitting access to body member 10, in proximity to lower plate 12; the last mentioned opening being normally closed by door member 18 that may be hingedly mounted as at 19. Any desired form of latching or locking mechanism may be associated with the body member 10 and door sections 15, 16 and 18 respectively, in order that the latter may be securely held in a closed position.

Conducting member 20 is arranged to have communicative relation with outlet opening 13 of the oven, said conducting member being shown, in the present embodiment, as being substantially semi-circular when viewed in cross section and provided with longitudinal wing flanges 21 to be secured in top plate 11, as shown in Fig. 1. Conducting member 20 communicates, at its open end, with a conduit 22 that is carried upon body member 10, as in Fig. 4, one end of conduit 22 in turn communicating with a pipe 23 carried upon bottom plate 12 in the manner shown. Conduit 22 is provided with suitable valves or damper means 24 and 25 respectively, to each side of the point of communication of conducting member 20, whereby the heated air passing thereinto may be either directed to the pipe 23 or to the open upper end of conduit 22, as is obvious. Cap 26, shown in Fig. 4, may be utilized to close the upper end of conduit 22.

Hollow mixing drum or chamber 27 that is open at its upper end, is associated with bottom plate 12 as in Fig. 4, so that communication may be had with the interior of body member 10 by way of opening 14 while pipe 23 also communicates with drum 27 whereby the heat products passing from conducting member 20 to conduit 22, may be introduced thereinto. Bottom plate 28 of drum 27 is provided with suitable spaced ingress openings 29 which are normally closed through the medium of a turnably mounted plate 30 carried thereon, as in Fig. 8. However, plate 30 is provided with openings 31, which when brought into registry with openings 29, by means of operating handle 32, will admit cold air into drum 27.

As shown in Fig. 4, conducting member 20 carries a slide valve 33 which, having connection with operating handles 34 may be operated so as to open or close outlet opening 13 of the oven. Consequently, the heat products may be confined within body member 10 or permitted to have egress through outlet opening 13, in accordance with the desire of the operator. It is obvious, therefore, that the heat products passing through conducting member 20, conduit 22 and pipe 23 will become mixed with the cold air prior to the admission of the latter into body 10 and thus obviate chilling of the oven as hereinbefore stated. The greatest of stress is directed to this feature of the invention.

Body member 10 further carries a transverse bearing member 35 in spaced relation to bottom plate 12 (as shown in Fig. 4), the said bearing portions serving to partially support the spider or bottom disk 36 of the article carrier. The central portion of this disk 36 may be enlarged as at 37 and provided with a suitable bearing 38 to engage with bearing 35; although this construction may be deviated from, if desired.

Inner ring 39 is mounted above bearing 35 and carries, throughout its extent, a series of supporting wheels 40 upon which the perimetral portion of disk 36 rests. This arrangement of wheels precludes tilting or sagging of disk 36 and, incidentally, relieves bearing member 35 of a great deal of strain.

A series of strips 41 have their lower ends affixed to disk 36, as at 42, while their upper end portions are bent to form spacing arms 43; the latter being subsequently connected with disk 44 that operates in conjunction with bearing member 45. Throughout their vertical extent, strips 41 may be provided with suitably spaced supporting lugs or projections 46 thereby providing for the support of the plates shown in Figs. 5 and 6, in different positions. Disk 36, if so desired, may be formed in a single piece, such as by molding, etc., while strips 41 are preferably formed of durable metal so as to provide a rigid support.

Disk 36 has located upon its under face, a circular rack or gear rim 47 with which pinion 48 has co-meshing engagement. Pinion 48 is in turn carried upon drive shaft 49 that is journaled through body member 10 as in Fig. 3 whereby rotative movement may be imparted to the article carrier by means of handle 50. Consequently, by moving the article carrier at certain times, or continuously, provision is made for the uniform distribution of heat throughout the article carrier and likewise, the uniform baking of the bread, or other substance carried thereby.

A ring 51 may be affixed to body member 10, as in Fig. 4, for carrying supporting legs 52 as at 53. This particular construction, as will be noted, eliminates excessive strain on body member 10 and serves as an efficient mounting for the several supporting legs.

Top plate 11 supports a heating plate 54 in spaced relation thereto, through the instrumentality of spacers 55, said heating plate comprising a series of spiders 56 and burners 57. A main fuel pipe 58 has a series of controlling valves 59 to control admission of fuel to burners 57 by way of pipes 60. Main fuel pipe 58 is extended as shown at 61 to be in proximity to the lower portion of body member 10 and is provided with a controlling valve 62, whereby the admission of fuel into burner 63 by way of pipe 64 may be regulated. In order to properly distribute heat from burner 63 and to prevent the flame thereof from coming into contact with the contents of the article carrier, I provide a distributing plate 65, that is held in spaced relation to bottom plate 12 and burner 63 through the instrumentality of spacers 66.

For introduction into the article carrier, I provide suitable plates as shown in Figs. 5 and 6, whereby the material to be baked can be conveniently supported. Plate 67 shown in Fig. 5, is preferably of the spider type and consists of two independent sections 68 and 69 respectively. Plate sections 68 and 69 have central bars 70 and 71, bar 70 having a groove 72 to receive tongue 73 of bar 71 when said sections are moved into contacting relation. Bar 70 is further provided with a retaining stud or projection 74 which, when the sections are in contacting relation, enters cut outs 75 of bar 71 and precludes independent tilting of the plate sections.

Plate 76, shown in Fig. 6, however, comprises independent plate sections, whose body is formed of heavy wire bent into semicircular configuration as at 77 and 78. Cover sheets 79 and 80 are then associated with wire frames 77 and 78, said sheets having their edges bent to embrace the wire as clearly illustrated in Fig. 7. In order to provide for the proper retention of the plate sections, after their insertion in the article carrier, one section may be provided with spaced receiving jaws 81 and 82 to engage with the inner edge of the other section, as is obvious. By reason of its peculiar construction, the plate shown in Fig. 6 serves as an efficient heating plate and at the same time one which will prevent displacement of the articles placed in the carrier.

A drip pan 83 is also arranged beneath heating plate 54 to catch the various drippings and dirt, and operates on runners 84 whereby it may be readily removed or replaced.

The operation of my invention is substantially as follows:—The burner 63 may be lighted either by way of the door 18 or, if so desired, by means of the nipple 62', which as shown in Fig. 3, is disposed exteriorly of the housing. When the interior of the oven has become heated, to the desired degree (which may be ascertained upon reference to an indicator such as shown at 17') the articles to be baked may be positioned on the article carrier, or more particularly upon either of the carrying plates 67 or 76 respectively, or their equivalent, by way of the doors 15 and 16. Heat from the burner 63 will be equally distributed throughout the article carrier by means of distributing plate 65 and the contents of the carrier will be subsequently baked to a uniform degree. The heated air from the oven may escape through outlet opening 13 and a portion thereof will be conducted to drum 27 as aforesaid and again introduced into the body 10. Cold air which will be admitted through drum 27 will become thoroughly mixed with the heated product of the drum prior to its entrance into body member 10. The cap 26 is normally removed from the conduit, and the dampers 24 and 25 may be regulated to determine the amount of heated products that escape through the upper end of the conduit 22, and the amount that passes down through the conduit 22 and returns to the oven. The article carrier may be operated in the usual manner by means of the handle 50.

From the foregoing, it is believed that the advantages and novel features of my invention will be readily understood and, therefore, further detail description is deemed unnecessary.

In reducing my invention to practice, I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention, as defined in the appended claims.

Having thus fully described my invention, what I claim as new and desire to secure by Letters Patent is:—

1. A hollow body having a valve controlled inlet in its bottom, a valve controlled outlet in its top, a burner and mixing chamber associated with the inlet in the bottom, an upper conduit in communication with the valved outlet, a second conduit in communication with the said mixing chamber and the said upper conduit, and valves in the length of the second conduit above and below the point of communication of the upper conduit therewith.

2. A hollow body, comprising a shell and top and bottom plates, a valved outlet in the top plate, a mixing chamber on the bottom plate provided with a damper controlled air inlet, a burner in the mixing chamber, an upper conduit in communication with the valved outlet, a second conduit in communication with the mixing chamber and the upper conduit and opening into the air at its upper end, and valves in the length of the second conduit above and below the point of communication of the upper conduit therewith.

In testimony whereof I affix my signature in presence of two witnesses.

WILLIAM K. SCHAEFER.

Witnesses:
B. S. WILSON,
C. R. MUSGRAVE.

Copies of this patent may be obtained for five cents each, by addressing the "Commissioner of Patents, Washington, D. C."